(12) United States Patent
Scherer et al.

(10) Patent No.: US 9,103,462 B2
(45) Date of Patent: Aug. 11, 2015

(54) PRESSURE CONTROL VALVE

(75) Inventors: Georg J. Scherer, Kirchheim (DE); Helmut J. Mang, Memmingen (DE)

(73) Assignee: SVM SCHULTZ VERWALTUNGS-GMBH & CO. KG, Memmingen (DE)

( * ) Notice: Subject to any disclaimer, the term of this patent is extended or adjusted under 35 U.S.C. 154(b) by 216 days.

(21) Appl. No.: 12/805,507

(22) Filed: Aug. 3, 2010

(65) Prior Publication Data

US 2011/0042596 A1 Feb. 24, 2011

(30) Foreign Application Priority Data

Aug. 3, 2009 (DE) .......................... 10 2009 035 902

(51) Int. Cl.
*F16K 31/06* (2006.01)

(52) U.S. Cl.
CPC .................................. *F16K 31/0634* (2013.01)

(58) Field of Classification Search
CPC . F16K 31/0658; F16K 31/06; F16K 31/0655; F16K 31/0634; F16K 31/0675
USPC .................. 251/129.15, 330, 625.26, 625.27, 251/596.17, 596.18
See application file for complete search history.

(56) References Cited

U.S. PATENT DOCUMENTS

| 788,536 | A | * | 5/1905 | Irving | 251/129.15 |
| 2,283,903 | A | * | 5/1942 | Ashcraft | 335/217 |
| 2,521,308 | A | * | 9/1950 | Porter | 251/129.15 |
| 2,612,188 | A | * | 9/1952 | Persons | 251/129.15 |
| 3,955,795 | A | * | 5/1976 | Neely | 251/129.15 |
| 4,304,258 | A | * | 12/1981 | Mitchell | 137/596.17 |
| 2009/0025803 | A1 | * | 1/2009 | Scherer et al. | 137/544 |

FOREIGN PATENT DOCUMENTS

| DE | 10351504 | 6/2005 |
| DE | 102005059433 | 6/2007 |
| DE | 102007035472 | 1/2009 |
| DE | 1020009004803 | 7/2009 |
| WO | 96/17193 | 6/1996 |
| WO | 01/86178 | 11/2001 |
| WO | 01/88422 | 11/2001 |

* cited by examiner

*Primary Examiner* — John K Fristoe, Jr.
*Assistant Examiner* — Michael R Reid
(74) *Attorney, Agent, or Firm* — Jacobson Holman, PLLC.

(57) ABSTRACT

The invention refers to a valve which can be operated by a solenoid. The armature of the solenoid acts here on a control element. This is axially shifted here in such a way that the gap width of a gap provided in a valve bush changes. The control element consists of a control pin and a control part which manufactured separately from this and attached to the control pin, the control part interacting with the gap.

2 Claims, 3 Drawing Sheets

PRESSURE CONTROL VALVE

Figure 1:
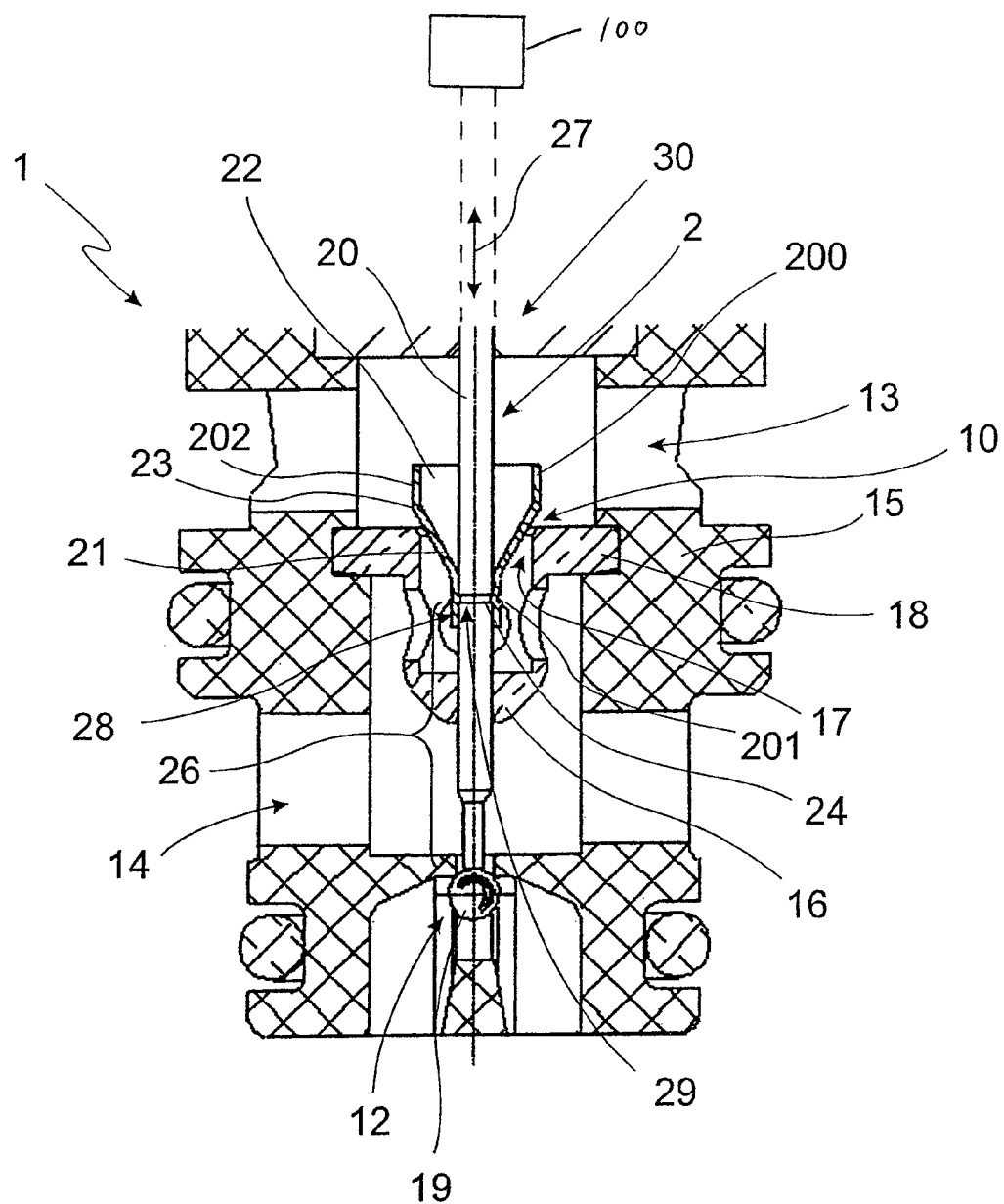

This application has a priority of German no. 10 2009 035 902.8 filed Aug. 3, 2009, hereby incorporated by reference.

The invention refers to a valve, in particular a pressure control valve, operated by a solenoid, wherein the armature of the solenoid acts on a control element of the valve and shifts it in such a way, in particular axially, that the gap width of a gap provided in or on a valve element, such as for example a valve plate or valve bush, changes, and the gap closes or opens, respectively.

BACKGROUND OF THE INVENTION

In pressure control valves operated by solenoids the power of the solenoid changes the gap between the control element and the valve seat arranged in the valve bush or the valve element, and thus the hydraulic pressure at the work connection is controlled. The gap is limited, on the one hand, by the valve seat and, on the other hand, by the terminating surface provided on the control element. As the position of the control element, and therefore the terminating surface, can change, also the distance (gap width) of the surfaces limiting the gap changes. The control element consists here of a control pin produced from metal, usually turned, to which a suitable seal surface is attached in one piece interacting with the valve seat. The solenoid consists of a coil which can be charged with electricity encircling an armature space. In the armature space an armature acting on the control element is supported moving on bearings the axial position of which can change by the electrifying of the coil. Because of this axial position change the gap width on the control element changes, of course, also opening or closing of the valve is possible.

Producing the control element by turning and therefore removing material is expensive.

SHORT SUMMARY OF THE INVENTION

Therefore it is an object of the invention to suggest a valve which can be produced more economically.

This problem according to the invention is solved by a valve as described in the beginning, where it is suggested that the control element is formed by a control pin and a control part produced separately from it and attached to the control pin, and the control part interacts with the gap.

The invention here intentionally suggests a multi-piece construction of the control element as the effort for machining for in particular the control part can be reduced clearly by that. Now it is possible to optimize the control part for the respective case of application, for example depending on the operating pressure, medium which has to be controlled, and so on, and to use always the same control pin for the movement of the control part. Therefore the batch size of the standardized control pins which are connected with accordingly optimized control parts remain therefore very large. The gap is limited, on the one hand, by the valve seat, and, on the other hand, by the terminating surface arranged on the control part. The gap width is defined, for example, via the shortest distance between the valve seat and the terminating surface. The seal surface is here a part of the terminating surface.

Control part and control pin are connected here to each other in a suitable way, for the pairing of their materials very different variations are possible here. Gluing may be provided here, however, it is also possible to use, according to the invention, jamming, welding or another positive or non-positive connections. As deliberately also differing materials of control part and control pin are comprised by the invention, the more economic production of a valve according to the invention comes with a higher valve dynamic, namely if for the control part a lighter way of construction is realized, for example with a material with less thickness. Because of the here possible module principle a pressure control valve according to the invention can be optimized here by using the same control pin also with reference to its valve dynamic by varying the respective control part to the respective application.

Here the saved material and mass, respectively, is not only based on an accordingly differing selection of materials for control pin and control part, basically the invention also comprises applications where control pin and control part are made from the same material, wherein, however, for example the control part is produced from a plane material by a punch-bending or punch-sinking process, which can be realized very economically in a mass production, and then, because of the low wall thickness of the control part, contributes to a suitable mass production; the identity of materials, however, allows, for example, welding of the control part on the control pin!

In the application the term valve plate or valve bush is described as an example of design of the valve element. As far as a characteristic has only been used for the characteristic of the valve bush or the valve plate, or is defined here, this does not restrict the invention in this area. Instead of the term valve bush or valve plate, generally also the term valve element can be used.

In the same way the invention can also be applied to valves, in particular pressure control valves where the armature acts directly or indirectly on the control element. If the arrangement is indirect, for example, a transition element is provided between the armature and the control element which is, if necessary, even cantilevered, in the same way as also the control element. Resetting or a stopper is reached, for example, by a suitable pullback spring or the like. Of course, it is also provided according to the invention that the control element, in particular the control pin, is connected fixedly (and thus for example directly) with the armature. Both above mentioned modifications are part of the invention.

With reference to the design of the control part the invention can also be employed very variably. It is possible that the control part is designed like a disc, plate, cone, funnel or tapered, the possibilities of realization of the control part being not restricted to these modifications. Thus it is, for example, possible that also ring disc-like control parts and so on can be used. Of course, the suitable choice of the control part has to be adjusted to the case of application and the design of the valve bush, in particular the valve seat so that the different types of control parts relate to the respective application cases.

It has been found that funnel-like, cone-like or tapered control parts have advantages, in particular with fast acting valves or fast controlling pressure control valves, as they have, besides the higher valve dynamic caused by the mass reduction, also a higher stability against pressure vibrations because of the cone-like, tapered or funnel-like design. Therefore, then the control part has on the back an accessible chamber, as it is also shown in the drawings (see reference number 22).

The tapered design has furthermore a design with good flow characteristics which diverts the medium to be controlled in a suitable way, following the surface of the tapering. By means of such a design even with high pressure a flow as laminar as possible can be kept, and flow losses are accordingly avoided.

In a preferred embodiment of the invention the control part is thin-walled. The thickness of the wall limiting the control part is here clearly smaller than the diameter of the control pin or its radius. Besides a relative definition of the term "thin-walled" with reference to other dimensions of the valve according to the invention, the thin-walled quality, however, can also be described as an example (and therefore not restricting) with a wall thickness of less than 2 mm, in particular less than 1 mm, preferably less than 5/10 mm or 8/10 mm. The correct wall thickness results in particular from the application case of the invention. It is clear that an accordingly smaller material thickness contributes also to a reduced mass and therefore to a corresponding valve dynamic. It has to be taken into consideration here that the thin-walled design of the control part can be employed with disc-like, ring disc plate or even cone-like or tapered designed control parts. This modification according to the invention is here not only restricted to the particular choice of material of the control part, the control part can be realized from metal, for example light metal, aluminum, or even non magnetizable or unmagnetizable materials or steels.

Besides a thin-walled design of the control part the invention also includes, however, modifications where a cone-like or tapered control part is formed, for example, of solid material.

In a preferred modification of the invention the control part is characterized by a chamber or the rather thin-walled terminating wall of the control part encircles a chamber which is accessible from the backside, tilted away from the tip of the cone. Here usually the control part is connected with its cone or tapered tip with the control pin in such a way that the control pin penetrates the control part, and actually the design of the control part is truncated in this area which, however, can be seen, according to the invention, as described as cone-like, funnel-like or tapered. Because of the cone-like or tapered design the (exterior) terminating wall of the control part extends at an acute angle to the longitudinal axis of the control pin, and thus a chamber is formed which is also filled by the medium which has to be controlled or adjusted.

In a preferred embodiment it is provided that in the connecting area of control part and control pin on the control pin a circumferential groove or surface recess is provided filled by the material of the control part. By including a suitable circumferential groove or surface recess in the control pin during connecting the control part on the control pin material is pressed in and thus a positive locking is performed. The circumferential groove or the surface recess is here not only filled by the metallic material of the control part, the control part can also consist, for example, of synthetic material, and can be arranged in a plastic injection process on the control pin, wherein then the (still liquid) plastic fills the circumferential groove or a suitable surface recess.

The basically two-piece construction of the control element with control pin and control part makes it possible that control pin and control part can also be of different materials, however, the modification where both are produced from the same material is also part of the invention (e.g. metal with metal, or synthetic material with synthetic material). Control part and control pin, respectively, can therefore be formed by plastic, fiber reinforced plastic, high temperature resistant plastic, highly resistant plastic, or metal, in particular non-magnetic or low-magnetic material, such as suitable steels and so on. Furthermore the control part is, alternatively for example, formed also from a metal film or a thin-walled metal part, alternatively it can also consist of ceramic.

Exactly the employment of new high temperature polymers with a melting point above 380° C. and a glass transition temperature of at least 150° C. makes it possible to provide economically high temperature resistant and light control parts, and thus also to handle reliably even more extreme application ranges of valves according to the invention, in particular pressure control valves.

In a preferred embodiment of the invention it is provided that the control pin is guided or supported on bearings in a core, and the core has a raised part facing the control part which immerses at least during an axial return movement of the control pin at least partly in the chamber. In this example, as it is also shown in the drawing (see FIGS. 2 and 3) an additional improvement against pressure vibrations has been observed, as this magnet geometric (in particular if in every operating position of the control part projects in the chamber) results in an additional absorption quality. The result of the immersion of the raised part in the chamber is that the volume of the medium within the chamber is separated (almost) completely from the other volume flow, and a corresponding medium wave penetrates no more here or only very damped. Therefore, the result is that the cone-like, funnel-like or tampered, if necessary also, thin-walled control part is "stiffened". Thus a high stability against the vibrations of the medium is combined with a high valve dynamic because of the low weight of the control part.

In the same way, however, the invention also comprises a solution where a one-piece modification of the control element is produced, for example, from plastic or metal. Material for the one-piece embodiment of the control element can be here all materials described in this application, that is, for example, plastic, fiber reinforced plastic, high temperature resistant plastic, highly resistant plastic, metal, in particular non-magnetic or low-magnetic metal, thin-walled metal, sheet metal or film, and ceramic, respectively. Generally here, for example, suitable steels are used, however, it is also possible to employ, for example, copper, aluminum or other metals according to the invention. The choice of the above mentioned metals relates here to all application cases of this invention and application, respectively.

It is also possible here to produce a one-piece control element of metal materials, for example by turning or with a suitable process, such as for example drawing and folding. Basically, it is also possible, if the materials of control element and control part are the same, that the two separately manufactured elements are, for example welded, to each other later, and thus are in one-piece according to the definition (because of the identical materials and the identical connection of the materials), but nevertheless the advantage according to the invention has been reached in the production.

BRIEF DESCRIPTION OF THE DIFFERENT ELEMENTS OF THE DRAWINGS

Figure 2:
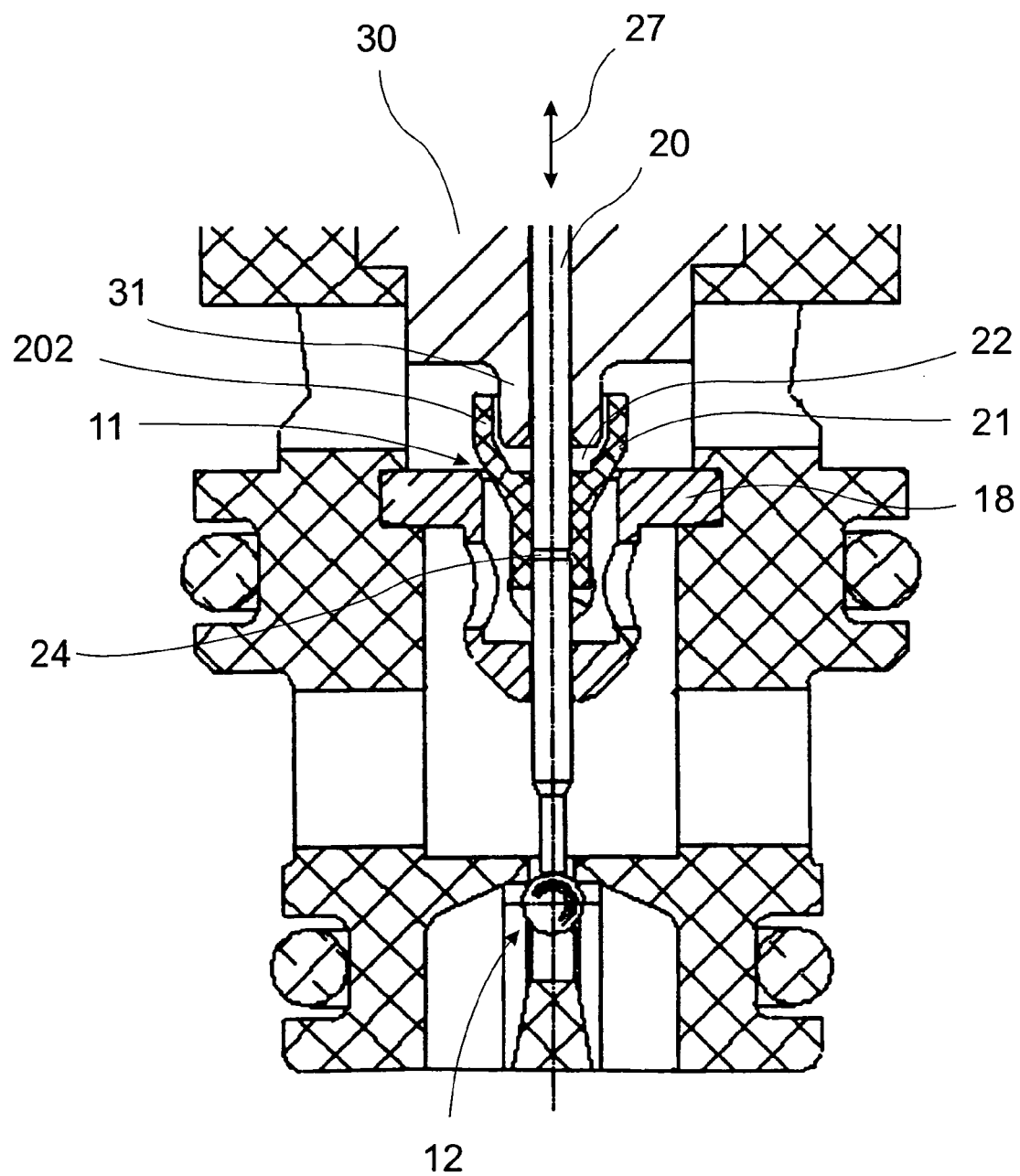
Figure 3:
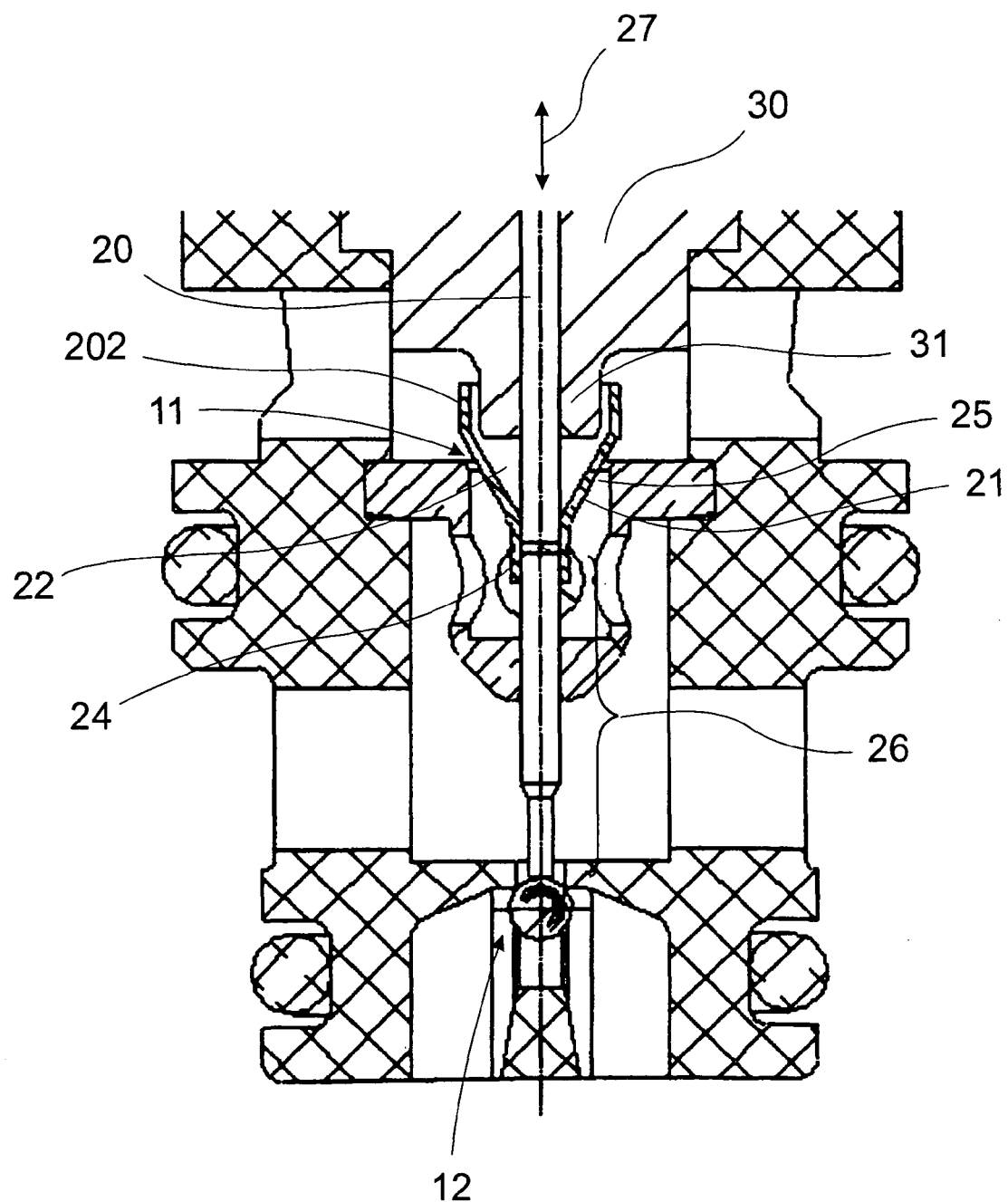

In the drawing the invention has been shown schematically in particular in an example. In the drawings:

FIGS. 1, 2 and 3 each in a sectional view different modifications of the valve according to the invention.

DETAILED DESCRIPTION OF THE PREFERRED DESIGN

In the figures identical or corresponding elements each are indicated by the same reference numbers, and therefore are, as far as not advisable, not described anew.

The valve 1 according to the invention is shown schematically in different modifications in the figures. The shown valve 1 is operated and controlled, respectively, by a solenoid 100 which is also part of the invention. Usually, a solenoid comprises an armature supported moving on bearings in the armature compartment acting on the control pin 20. The armature compartment is surrounded by a coil which can be electrified which generates a suitable magnetic field. According to the generated magnetic field the armature shifts axially so that also the control pin 20 is shifted axially.

The control pin 20 is here a part of the control element 2.

The solenoid would be linked above the valve 1, the control pin 20 is supported or guided in the core 30 in a suitable way.

The valve 1 shown in the drawing is designed in particular as pressure control valve. The valve 1 here comprises a valve bush 15, in which a valve seat 11 is provided. In the example shown here the valve seat 11 is realized by a carrier 18 with centric penetration opening 17 and a guide cage 16 connected underneath.

The double arrow 27 indicates axial adjusting of the control element 2. Because of the tapered design of the control part 21 it becomes clear that the control part 21 releases more or less the opening 17 provided in the valve seat 11 depending on the axial position (27) of the control part, that means it enlarges or reduces the gap 10.

In the modifications shown FIGS. 1, 2 and 3 the axial position of the control part 21 is thus that the gap 10 is closed almost completely, that means the control part 21 sits almost in the valve seat 11. The result is here a choking of the medium pressure and thus a suitable reduction of the pressure at the work connection 14. The medium, which may be, for example, liquid or gas, is connected to the pressure connection 13.

An essential part of the invention is the fact that the control element 2 is in two pieces, that means it has a control pin 20 and a control part 21 which is manufactured separately and, if necessary, consists of identical or different materials. For an exact, but also mechanically stable, connection on the control pin 20 on a suitable spot a circumferential groove 24 is provided in which material of the control part 21 immerses, according to the connecting process of control part 21 to control pin 20. By means of that it is possible to realize a positive locking between the control part 21 and the control pin 20 which can be stressed mechanically.

As shown in the drawings, the control part 21 is not provided on the end of the control pin 20, but there is still a certain projecting end 26 below the connecting area 28, which comprises, of course, the circumferential groove 24. By means of this projecting end 26 other control pieces 12 of the valve are selected for different purposes. Below the carrier 18 the guide cage 16 is linked serving for guiding the projecting end 26 of the control pin. In the embodiment shown here, for example, a ball 19 is held in a cage in such a way that by operating the control pin 20 or the projecting end 26 it can only be shifted downward, and then releases a suitable passage. The ball 19 is here loose, that means separated from the control pin 20.

The control part 21 has a seal surface 25. This seal surface 25 is part of the exterior terminating surface or the surface area of the tapered or cone-like control part 21. A certain area of the terminating wall 23, which is rather thin-walled, is supported in the completely closed condition on the valve as seal surface 25 on the valve seat 11, and seals the gap 10 completely. The material thickness of the thin-walled terminating wall 23 is here less than 1.5 mm, preferably less than 1.0 mm, in particular less than 800 µm. Depending on the diameter of the control pin the wall thickness is less than 50%, preferably less than 35%, in particular less than 30%.

The embodiment for the control part 21 shown in FIG. 1 consists of a metal part produced preferably in a forming process being formed tapered or funnel-like, and is put on the control pin 20 concentrically because of the center opening 29. It is typically for the funnel-like (200) design of the control part 21 that a chamber 22 is provided which runs in the opening 29 if the control pin 20 has not been inserted.

The chamber 22 is accessible here on the side opposite the valve seat 11, and the medium to be controlled flows through it in a suitable way.

It can be seen clearly that the design of the control part 21 according to FIG. 1 has a continuous wall thickness. This results when a suitable control part is produced from a metal part in a forming punch-folding or punch-sinking process. This forming can be realized economically. At the narrow point 201 of the tapered or funnel-like (200) control part 21 limiting the opening 29 the material of the narrow point 201 is pressed or jammed in the circumferential groove 24 of the control pin in the following connecting process, and thus an exact connection which can also be mechanically stressed is produced. Alternatively the groove is filled by glue.

The control part 21 expands from the narrow point 201 upwards tapered or funnel-like, and then ends with a ring 202 with constant radius. The upper edge of the ring 202 forms also the end of the control part 21 and limits the chamber 22.

In contrast to the suggestion according to FIG. 1 the modification according to FIG. 2 shows a varying control part as well as a modified design of the core 30 with a concentric (with reference to the axis of the control pin 20) raised part 31.

The design of the control part 21 shown in FIG. 2 is also again funnel-like or, seen from the outside, tapered. The functioning of the control part shown here can be compared with the one of FIG. 1 and is identical. However, in FIG. 2 the control part 21 has been generated in one plastic moulding process, so that the result is a somewhat larger wall thickness. Here also the wall thickness itself is not the same overall, this can be realized by suitable designs of the moulding tool. For a stable connection of the control part 21 consisting of plastic, fiber reinforced plastic (for example carbon fiber or glass fiber reinforced plastic), high temperature resistant plastic or highly resistant plastic on the control pin 20 also a ring groove 24, or, if necessary, also other surface recesses are provided so that a positive locking is reached between the control pin 20 and the control part 21.

In the embodiment shown here on the core 30 a raised part 31 facing the valve seat 11 is arranged concentric around the bearing of the pin 20 in the core 30. Independent from the axial position 27 of the pin 20 (and therefore of the control part 21) this raised part 31 projects in the chamber 22 of the control part 21. However, a small opening gap (annular) remains between the raised part 31 and the annular section 202 through which the medium to be controlled can flow. This construction reaches a higher stability against pressure vibrations.

The suggestion according to FIG. 3 substitutes the control part 21 formed of plastic in FIG. 2 by the control part 21 according to FIG. 1 which is made of metal. Here also the raised part 31 immerses in the chamber 22, a gap remaining between the edge of the raised part 31 and the ring section 202 of the control part.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly, changes can be considered which can be made without departing from the contents of the described invention.

The invention claimed is:

1. A pressure valve operated by a solenoid acting on a control element of the valve, the control element being axially shifted, the valve comprising a gap width of a gap provided in a valve bush being charged so that the gap is enlarged or reduced, respectively, the control element being formed by a control pin and a control part, the control part being produced separately from and being a different part from the control pin, the control part being fastened on the control pin, with the control part being formed funnel-or cone shaped and the control part interacting with the gap formed by an opening between the valve bush and the control part to enlarge or reduce said gap and to thereby control a medium pressure, upon movement of the control pin, the control part engaging in the opening for choking the medium pressure by enlarging or almost closing the gap and an end of the control pin projecting from the control part and being provided as a projecting end extending through the valve bush and interacting with further control pieces of the valve, wherein the control pin is guided or supported on bearings in a core facing the valve bush, the control part comprises the chamber, and the core has a raised part facing the control part, the raised part immersing at least partly in the chamber.

2. A pressure valve operating by a solenoid acting on a control element of the valve, the control element being axially shifted, the valve comprising a gap width of a gap provided in a valve bush being charged so that the gap is enlarged or reduced, respectively, the control element being formed by a control pin and a control part, the control part being produced separately from and being a different part from the control pin, the control part being fastened on the control pin, with the control part being formed funnel-or cone shaped and the control part interacting with the gap formed by an opening between the valve bush and the control part to enlarge or reduce said gap and to thereby control a medium pressure, upon movement of the control pin, the control part engaging in the opening for choking the medium pressure by enlarging or almost closing the gap and an end of the control pin projecting from the control part and being provided as a projecting end extending through the valve bush and interacting with further control pieces of the valve, the control pin being guided or supported in a core facing the valve bush, the control part defining a chamber for receipt of a fluid, and the core having a raised part facing the control part, the raised part immersing at least partly in the chamber.

* * * * *